United States Patent [19]
Sibecas et al.

[11] Patent Number: 5,940,756
[45] Date of Patent: Aug. 17, 1999

[54] METHOD FOR TRANSMITTING PAGING COMMUNICATION ON A CELLULAR COMMUNICATION SYSTEM

[75] Inventors: Salvador Sibecas, Lake Worth; William J. Kuznicki, Coral Springs; Eric Thomas Eaton, Lake Worth, all of Fla.

[73] Assignee: Motorola, Inc., Schaumburg, Ill.

[21] Appl. No.: 09/031,523

[22] Filed: Feb. 27, 1998

[51] Int. Cl.[6] .................................................. H04Q 7/24
[52] U.S. Cl. ...................... 455/426; 455/445; 455/552; 340/825.44
[58] Field of Search ................................. 455/426, 435, 455/445, 458, 466, 507, 509, 552, 553, 560, 556, 557, 31.3, 38.1; 370/465, 466; 340/825.44, 825.54

[56] References Cited

U.S. PATENT DOCUMENTS

| | | | |
|---|---|---|---|
| 5,153,903 | 10/1992 | Eastmond et al. | 455/426 |
| 5,239,306 | 8/1993 | Siwiak et al. | 340/825.44 |
| 5,283,570 | 2/1994 | DeLuca et al. | 340/825.4 |
| 5,392,452 | 2/1995 | Davis | 455/426 |
| 5,636,211 | 6/1997 | Newlin et al. | 370/465 |
| 5,696,500 | 12/1997 | Diem | 340/825.44 |
| 5,706,331 | 1/1998 | Wang et al. | 455/38.1 |

*Primary Examiner*—Wellington Chin
*Assistant Examiner*—Lee Nguyen
*Attorney, Agent, or Firm*—Keith A. Chanroo

[57] ABSTRACT

A method for transmitting a paging message on the cellular communication system (126) includes the steps of: acquiring a paging signal as a control channel for a selective call device (120), the paging signal indicating a geographic location, receiving a control flag indicating a cellular channel to the selective call device (120), registering with the cellular communication system (126) on the cellular channel indicated by the control flag of the paging signal, sending status information from the cellular communication system (126) to the paging communication system for authenticating the selective call device (120), receiving the paging message on the control channel of the paging communication system (350), transmitting an address and a vector on the control channel to the selective call device (120) directing the selective call device to the cellular channel of the cellular communication system (126) for receiving the paging message, reading a flag in the paging signal to determine if the paging communication system (350) is requesting the selective call device to acknowledge its receipt of the address and vector, transferring the paging message to cellular communication system (126) for transmission on the cellular channel to the selective call device (120) in response to the paging communication system (350) receiving an acknowledgment from the selective call device (120) indicating that the vector was received, and transmitting the paging message by a cellular base station (104) located within the geographic location indicated by registration information stored in cellular communication system (126).

14 Claims, 13 Drawing Sheets

METHOD FOR TRANSMITTING PAGING COMMUNICATION ON A CELLULAR COMMUNICATION SYSTEM

FIELD OF THE INVENTION

This invention relates in general to communication systems, and more specifically to a method for combining a paging communication system with a cellular communication system.

BACKGROUND OF THE INVENTION

In many metropolitan areas, most selective call systems are operated at, or near, the maximum system capacity, in both the number of subscribers that can be accommodated, and the message transmission time that is available. Such selective call system operation has resulted in reduced customer satisfaction due to extended times required to access the selective call system, and extended delays in message delivery due to equally extended selective call system message transmission queues. At present, this need is being offset by increasing the data rate of the protocol used.

To further aggravate the problem, the limited radio spectrum available worldwide or nationwide makes it challenging to provide seamless communication to and from pagers. It has become necessary to equip pagers with frequency synthesizers to enable them to scan or select among a plurality of frequencies within the available selective call spectrum when the pagers are roaming or have lost their signal. However, because there are a limited number of available selective call frequencies, no significant system expansion can be achieved or expected although there is a significant increase in the message length and the number of subscribers.

Thus, what is needed is a paging system that can improve message delivery by penetrating existing cellular communication systems without changing the paging protocol or cellular protocol and without requiring any more dedicated selective call frequency allocations.

DESCRIPTION OF A PREFERRED EMBODIMENT

Figure 1:
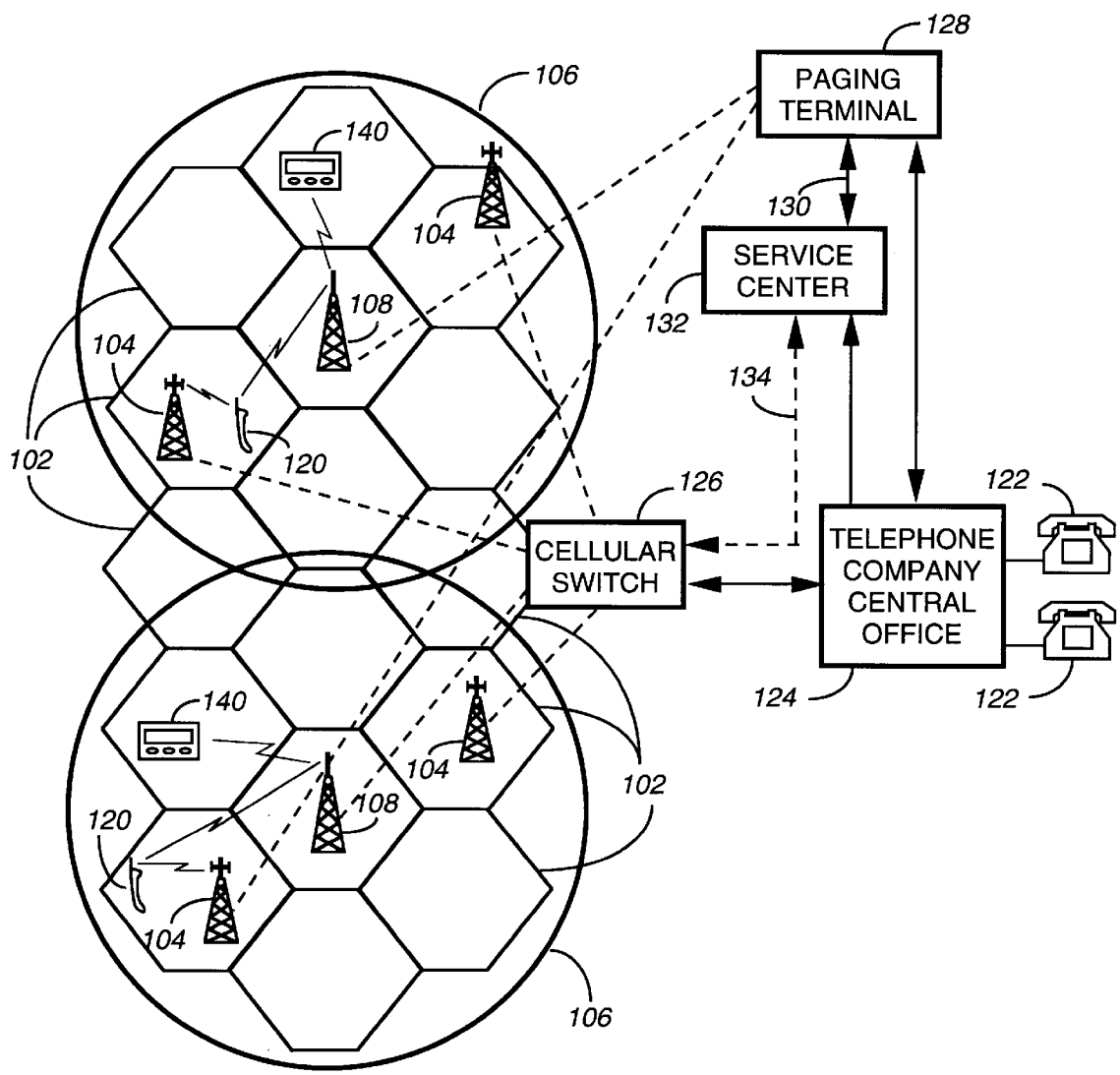
FIG. 1 is a pictorial block diagram of a combined paging communication system and cellular communication system in accordance with a preferred embodiment of the present invention.

Referring to FIG. 1, a pictorial diagram of an integrated or combined paging communication system and cellular communication system 100 in accordance with a preferred embodiment of the present invention. The integrated communication system 100 includes a plurality of cellular transmission regions 102 each of which includes an antenna tower and a base station 104 utilized in the transmission of calls to portable communication units, e.g., cellular telephones 120, selective call receivers 140, or other personal communication transceivers. It will be appreciated that the antenna tower and base stations 104 are associated with each of the plurality of cellular transmission regions 102, although only four are being shown for illustration and simplicity. The transmission of calls to the cellular telephones 120 from the antenna and base stations 104 within each cellular transmission region 102 is well known in the art.

Also shown in FIG. 1 are a number of paging transmission regions 106, two of which are being shown. Each paging transmission region 106 overlaps a number of the cellular transmission regions 102. In the example shown, each paging transmission region 106 overlaps over ten cellular transmission regions 102; although it will be appreciated that the actual number of regions that are overlapped is dependent on the actual size of each cellular transmission region 102 relative to each overlapping paging transmission region 106. Each paging transmission region 106 includes an antenna and base station 108 that are located substantially within the center of the transmission region.

Calls placed by callers using the telephone system are directed to the cellular telephone portion of the portable communication device 120, which includes a callers' telephone 122 that couples through the public switched telephone network (PSTN) to the telephone company central office 124. From the telephone company central office 124, the calls are coupled via telephone lines preferably to a service center (SC) 132 then to a cellular switch 126. The service center 132 couples the cellular system, preferably, the Global System for Mobile Communication (GSM) protocol networks and the paging system, preferably, the FLEXT™ paging protocol networks, by a dual mode control protocol. Using existing protocols within the GSM infrastructure, the service center 132 interrogates entities within the GSM system such as the Home Location Register (HLR) and the Visitor Location Register (VLR) to obtain location update and status information, the details of the HLR and VLR will be described in further detail below. The service center 132 also decides which system will be used to transmit an incoming message. The service center 132 communicates with both the FLEX paging network and the GSM cellular network via the telephone lines and transfers status information between the paging networks and the cellular networks. Think of the service center 132 as the "middleman" between callers and the FLEX/GSM networks. The cellular switch 126 selectively couples the calls via the telephones lines, or link transmitters and receivers (not shown), to the appropriate antenna tower and cellular base station 104 within the cellular transmission region 102 in which a cellular telephone 120 is located for which the call is directed. The operation of a cellular system for the transmission of calls between a land line based telephone and a portable cellular telephone is well known in the art. One such cellular system is described in U.S. Pat. No. 3,906,166 to Cooper et al, entitled "Radio Telephone System" which is assigned to the assignee of the present invention and which is hereby incorporated by reference herein.

Paging messages directed to the selective call devices 140, or the pager portion, of the portable communication device 120 are placed by callers also using the telephone system that includes the callers' telephone 122 which couples through the public switched telephone network (PSTN) to the telephone company central office 124. From the PSTN 124, the paging messages are coupled via the service center 132 and the telephone lines to a paging terminal 128 that processes the paging messages for transmission. After the paging messages have been processed for transmission, the processed paging messages are coupled via the telephone lines, or link transmitters and receivers (not shown), to the antenna and base stations 108 in each paging transmission region 106. The paging messages can be transmitted, generally, in a simulcast fashion from each of the antenna and paging base stations 108 throughout the region covered by the paging system.

Although paging communication systems and cellular communication systems have operated independently, handling calls for the cellular telephones and paging messages for the selective call receivers 140 operating within each of the respective systems, however, can pose problems when the paging receiver or selective call receiver 140 is combined with the cellular telephone 120. In the preferred embodiment of the present invention, a communication link 130 is established from the service center 132 to the paging terminal 128 and another link 134 is established from the service center 132 to the cellular switch 126. This enables the service center 132 to communicate with the paging terminal 128 to inform it when the cellular telephone portion of the portable communication device 120 is in use for which a paging message is intended and to couple the calls to the paging network or the cellular network.

Figure 2:
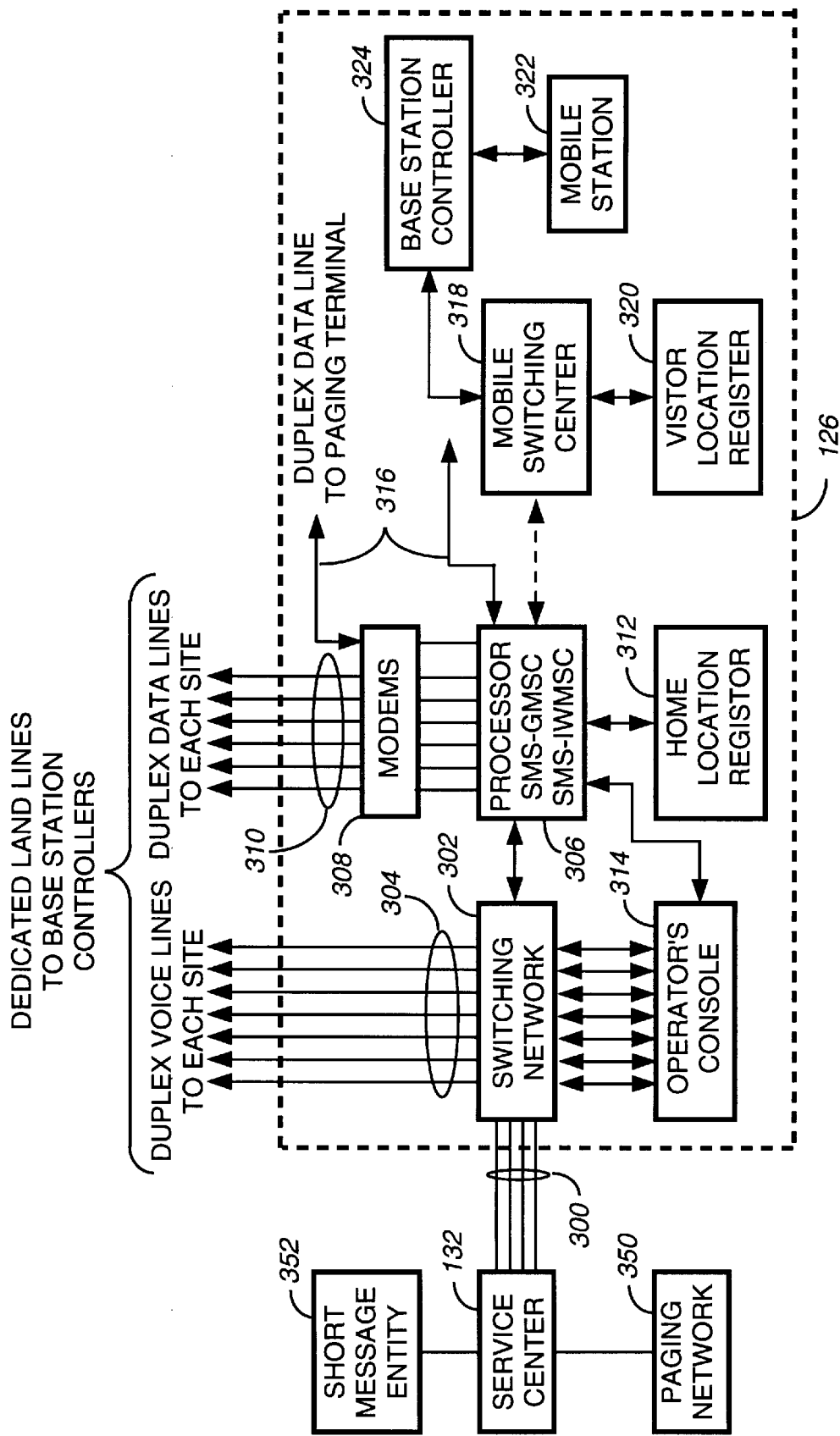
FIG. 2 is an electrical block diagram of a cellular switch in accordance with the preferred embodiment of the present invention.

FIG. 2 is an electrical block diagram of a cellular switch 126 suitable for use with the present invention. In general, the operation of cellular switches is well known in the art, so only a brief description is being provided herein. Calls originated from telephones located throughout the public switched telephone network are coupled through the telephone company central office via telephone lines to the service center 132, the details to be discussed below. The service center 132 is also coupled via the telephone lines 300 to a cellular switching network 302. The switching network 302 is controlled by a processor 306 to selectively couple calls to the cellular sites in which a cellular telephone 120 is located using duplex voice telephone lines 304 to each cellular site within the cellular system. The processor 306 also controls modems 308 to recover the location data or geographic location information which is then coupled from the modems 308 to the processor 306. The location data is stored in the home location register 312. The processor 306 controls call routing via the switching network 302. The processor 306 also performs the function of a Short Message Service Gateway Mobile Switching Center (SMS-GMSC) which is used to set up a call towards a GSM subscriber (cellular telephone). The functionality of the SMS-GMSC 306 are related to Short Message Mobile Terminated (SM-MT). The location or geographic location of each of the cellular telephones 120 within the cellular system is communicated to the processor 306 via duplex data telephone lines 310 which couple location data modulated as modem tones to modems 308. The modems 308 under the control of the processor 306 obtain the location information which is stored in the home location register (HLR) 312. A mobile switching center (MSC) 318 routes the calls towards the cell site where the subscriber unit is located or can obtain service. The mobile switching center 318 controls the routing and necessary intermediate buffering of short messages and performs the basic switching functions in the GSM network. In addition to fetching locations and routing messages, the processor functions as the SMS-GMSC to receive and send reports via the duplex data lines to other entities, inside and outside the GSM system, e.g., the paging communication system, to let it know if the message has been received successfully or if there was a failure during the transfer.

The processor 306 also operates as a short message service interworking mobile switching center (SMS-IWMSC) and is used for short message mobile originated (SM-MO). When a short message is originated by the mobile unit, the mobile switching center (MSC) 318, after receiving the information from a base station controller (BSC) 324, sends it to the processor operating as the SMS-IWMSC. When the processor operates as SMS-IWMSC, it is responsible for receiving messages, establishing, when necessary, a link through the telephone lines to the base station controller (BSC) 324 is being addressed, and transferring the short message to the base station controller 324. The base station controller 324 is in charge of all the radio interface management through the remote command of the mobile station (MS) 322. The base station controller's 324 main assignments are the allocation and release of radio channels and hand-over management. Each base station controller 324 typically controls up to several hundred base station transceivers, some of them co-located at the base station controller site and others remotely distributed and physically connected to the base station controller 324 by microwave link or dedicated lease lines. The interface which connects the base station transceiver to a base station controller 324 is called the Abis interface. The Abis interface carries both traffic and maintenance data and is specified by GSM to be standardized for all manufacturers.

The home location register (HLR) 312 subscriber's information is relevant to the provision of telecommunications services, e.g., the international mobile subscriber identity (IMSI), and is the number used to reach the user from a public network and also designates the subscriber's permitted supplementary services that is retained in the home location register 312. The HLR 312 also includes information related to the current location of the subscriber. The visitor location register (VLR) 320 is coupled to the mobile switch center 318. The VLR 320 functions as a temporary memory for storing the subscription data for the users currently in the network, in particular roamers. In the case of a roaming subscriber, the mobile switch center 318 updates its own VLR 320 after receiving the roamer's information from his or her home mobile switch center. In this way, the network can provide the features provided by the roaming subscriber's home network. One major difference between the VLR 320 and the HLR 312 is that the VLR 320 provides the mobile switch center 318 with the necessary subscriber data when a call is coming from a mobile station. On the other hand, the HLR 312 performs the same function when the call is coming from the public network. The HLR 312 and the VLR 320 also store such information as cellular telephone identification information, billing information, and other information necessary for the operation of the cellular system. An operator's console 314 is coupled to the processor 306 to enable control of the operation of the cellular system, and to provide access to and alteration of information stored in HLR 312 and VLR 320. The operator's console 314 also couples to the switching network 302 to provide monitoring of the operation of the system via the processor 306. A mobile station (MS) 322 is preferably equipped for short message service (SMS). A short message entity 352, e.g., a telephone network switching center or an integrated service digital network (ISDN), receives and submits a short message to the service center 132. The service center 132 transmits the message to the mobile station 322 and retains the responsibility of the message until a report arrives from the network or until a time-out period expires. The mobile station 322 after receiving a short message from the service center 132, returns a delivery report to the network for a received short message, notifies the network when it has memory capacity available to receive one or more short messages after it has previously rejected a short message because its memory capacity was exceeded and notifies the user to clear some of the stored messages in order to provide memory capacity for another incoming short message. The mobile station 322 will have stored in its memory both the FLEX and the GSM protocols.

The cellular switch 126 of the present invention provides a means of communication to the associated paging system. In one embodiment, to be described in detail below, the paging terminal determines the status of the cellular telephone through "busy" signals generated at the telephone company central office. In an embodiment shown in FIG. 3, the communication between the paging terminal and the cellular switch is accomplished using a dedicated duplex data telephone line 316 when the paging terminal/network 350 and the cellular switch 126 are remotely located from each other. The duplex data line 316 can also be part of a local area data network (LAN) when the paging terminal and the cellular switch are closely located to each other. Using the dedicated duplex data telephone line 316, information regarding the portable communication device 120, including the unitary cellular telephone and pager for which a paging message is intended, is transmitted from the paging terminal to the cellular switch to enable the paging network 350 to determine when the cellular telephone is actively engaged in a call. When the paging terminal determines that the cellular telephone 120 is actively engaged in a call, the paging message transmission is preferably inhibited.

Figure 3:
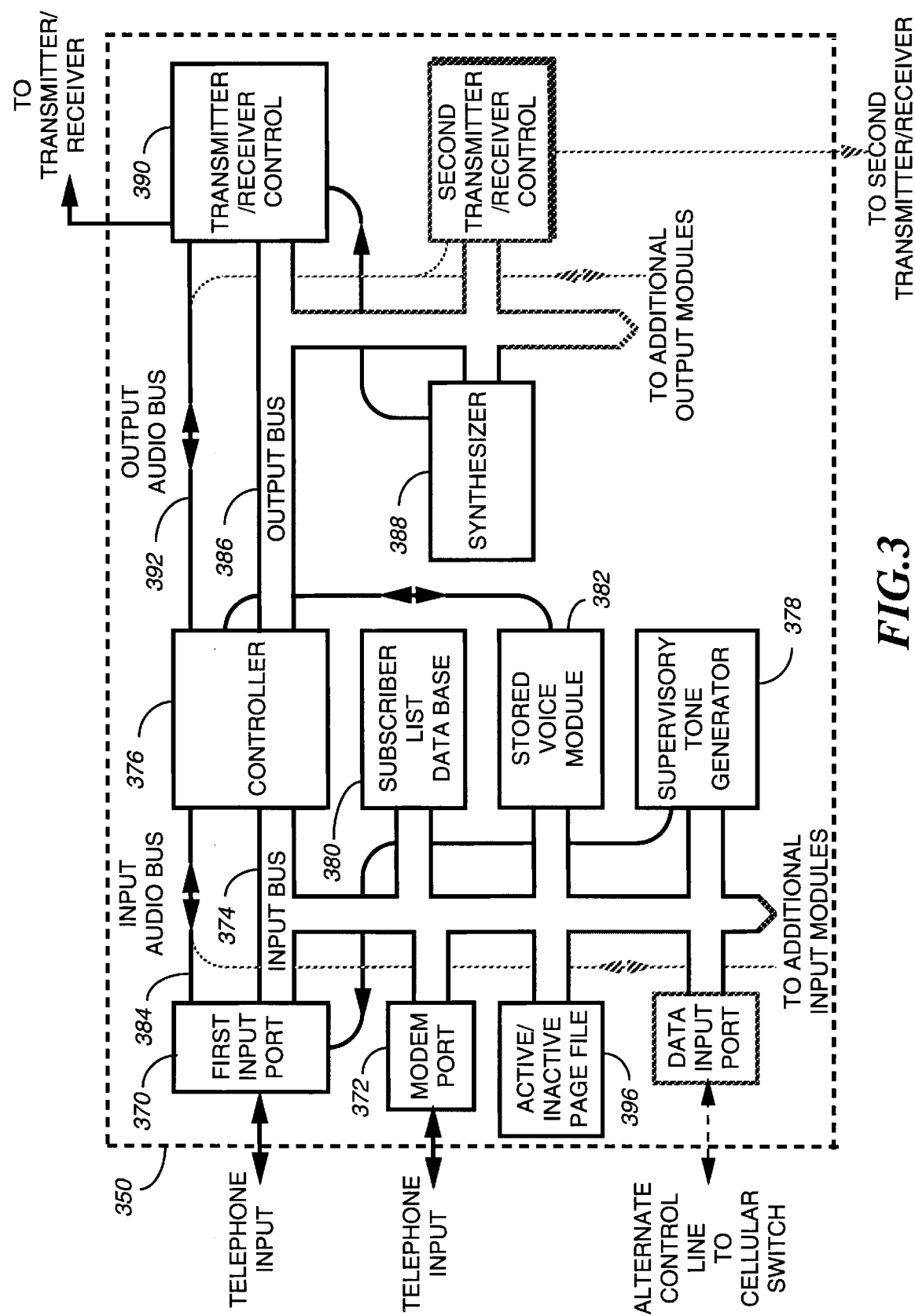
FIG. 3 is an electrical block diagram of a paging terminal in accordance with the preferred embodiment of the present invention.

FIG. 3 is an electrical block diagram of a paging terminal 350 suitable for use with the present invention. In general, operation of paging terminals are well known to one of ordinary skill in the art, so only a brief description of the operation is provided herein. One or more input ports 370 are connected to the public switched telephone system enabling paging messages to be entered by a caller using such page origination devices as, e.g., a telephone to access the paging terminal 128. When a call is received by the paging terminal 350, an output is generated on the digital input bus 374 which is coupled to the controller 376. The controller 376, through the digital input bus 374, enables the supervisory tone generator 378 to generate an acknowledgment tone which is coupled to the first input port 370. This tone is communicated to the caller through the telephone circuit and indicates that the paging terminal 128 is ready to accept the pager number of the paging receiver to be paged. As is well known in the art, the number of digits to be entered for the pager number is dependent upon the number of pagers operational within the system, e.g., as three digits for a 1000 pager system, etc. The three digits, entered as Dual-Tone-Modulated-Frequency (DTMF) tones from a touch-tone telephone when received through the first input port 370, are processed by a DTMF to binary converter to provide the digital data to be processed by the controller 376. The controller 376 checks the received pager number with the subscriber list data base 380, which is generally a non-volatile memory such as a hard disk or EEPROM memory which may be periodically altered and updated as required for the number of subscribers on the system, to determine the actual pager address code to be transmitted to the selected paging receiver 140.

The subscriber list data base 380 also includes information on those paging receivers which are combined with cellular telephones. When the controller determines from the subscriber list data base 380 that the paging receiver is combined with a cellular telephone, a control flag is set to indicate communication to the cellular switch is required prior to the transmission of the paging message, and information identifying the cellular telephone portion of the portable communication device is recovered.

In a first embodiment of the present invention, the controller 376 through the digital input bus 374 initiates contact with the cellular switch using a second input port (not shown). The second input port is configured to generate a sequence of DTMF tones corresponding to the cellular telephone number. If a call is being placed to integrated cellular telephone, a busy signal will be generated at the telephone company central office. The busy signal is decoded by a detector circuit within the input port, and the detected output is sensed by the controller which in turn enables supervisory tone generator 378 to generate a second acknowledgment tone, such as a "busy" tone, indicating to the caller that transmission of the paging message will be delayed. Controller 376 then initiates the generation of a third acknowledgment tone indicating to the caller to speak the message, as in a voice system, or to enter the message data, as in a numeric or alphanumeric message. It will be appreciated by one of ordinary skill in the art that voice lead-through responses may be generated in lieu of acknowledgment tones directing the caller to enter the pager number, telephone number and message, and to indicate that the paging message transmission is to be delayed.

When the transmission of the paging message is to be delayed, the controller 376, places the message data in an inactive page file in the active/inactive page file memory 396. When the message is a voice message, the caller's message is stored by controller 376 which directs the voice message through the input audio port 384 to an inactive message file located within the voice storage module 382.

When the cellular telephone 120 is not actively engaged in a call or when a pager 140 is being called, the controller 376 places the paging message in an active page file located either in the active/inactive page file memory 396 or stored voice module 382, depending upon the paging message type. When the controller 376 determines it is time to transmit the paging messages, the controller 376 through digital output bus 386, enables synthesizer 388 to generate either the proper digital address sequence corresponding to the selected portable communication device 120 to be paged. This address sequence is outputted to transmitter/receiver control 390 to be sent to transmitters 108 for transmission. When the message is stored in the voice storage module 382, the controller 376 enables the message to be recovered through the digital input bus 374. The message is routed through the controller 376 to the output audio bus 392 to transmitter/receiver control 390 to be sent to the transmitters 108 for transmission. The paging message signal corresponding to the address sequence and voice or data message is then transmitted by the transmitters 108.

When the cellular telephone 120 is found to be actively engaged in a call, the controller 376 will then periodically attempt to contact the cellular switch, as described above, at predetermined time intervals, such as once a minute for a predetermined retry period of three to five minutes. The repetition rate for determining the call status of the cellular telephone 120 is determined by such factors as the average minimum length of time for a call on the cellular system, whereas the predetermined retry period is set to the maximum call time interval, or a predetermined time interval after which the paging message is considered by the caller to be "stale". When the cellular telephone message duration exceeds the retry period, the controller deletes the paging message from the active/inactive page file memory 396.

Figure 4:
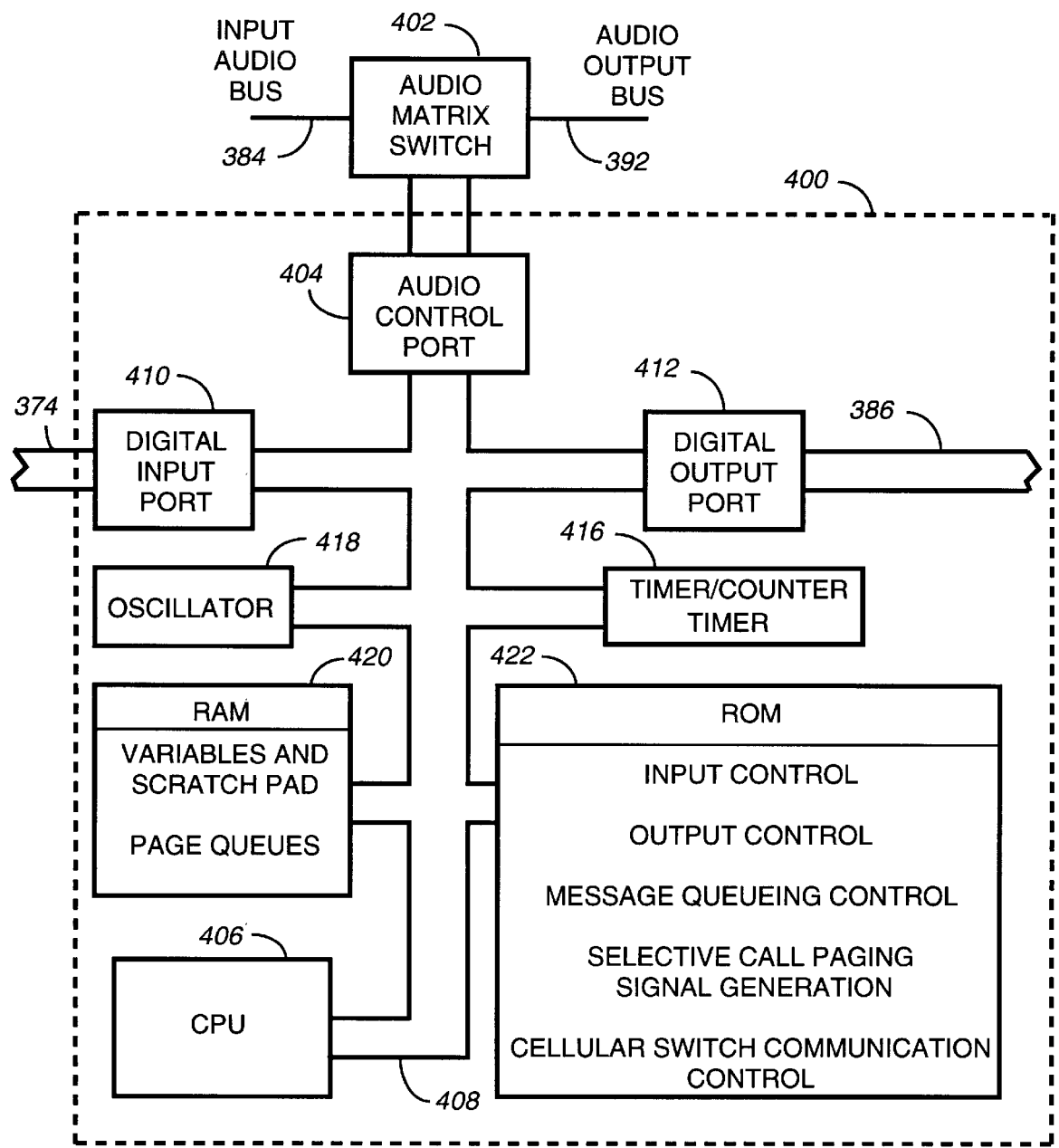
FIG. 4 is an electrical block diagram of the paging terminal controller in accordance with the preferred embodiment of the present invention.

FIG. 4 is an electrical block diagram of the paging terminal controller 376 suitable for use with preferred embodiment of the present invention. The controller 376 comprises of a microcomputer 400, e.g., an MC6809 microcomputer manufactured by Motorola, for providing digital control through the digital input bus 374 and the digital output bus 386. The controller 376 also has control of the input audio bus 384 and the output audio bus 392 through the audio matrix switch 402 through the audio control port 404. The microcomputer 400 includes a central processing unit (CPU) 406 for operational control. An internal bus 408 couples or connects all the elements of the microcomputer 400. The digital input port 410 couples to the digital input bus 374, the digital output port 412 couples to the digital output bus 386, and the digital audio control port 404 couples to the audio matrix switch 402. The timer/counter 416 is used to generate time intervals required for system operation, such as required to periodically determine the calling status of the cellular telephone 120 and the retry period. The oscillator 418 provides the clock for operation of the CPU 406 and the reference clock for the counter/timer 416. The RAM 420 is used by the CPU 406 and also provides an area for paging queues, such as the active paging files and the inactive paging files. It will be appreciated that depending upon the size of the system, additional RAM or other memory means, such as a hard disk, may be required to provide adequate storage for the paging queues and telephone numbers. The read only memory (ROM) 422 contains the firmware for controlling the microcomputer 400 operation. Included within the ROM 422 are routines providing for input control, output control, message queuing control, selective call paging signal generation, and cellular switch communication control, just to name a few.

Figure 5:
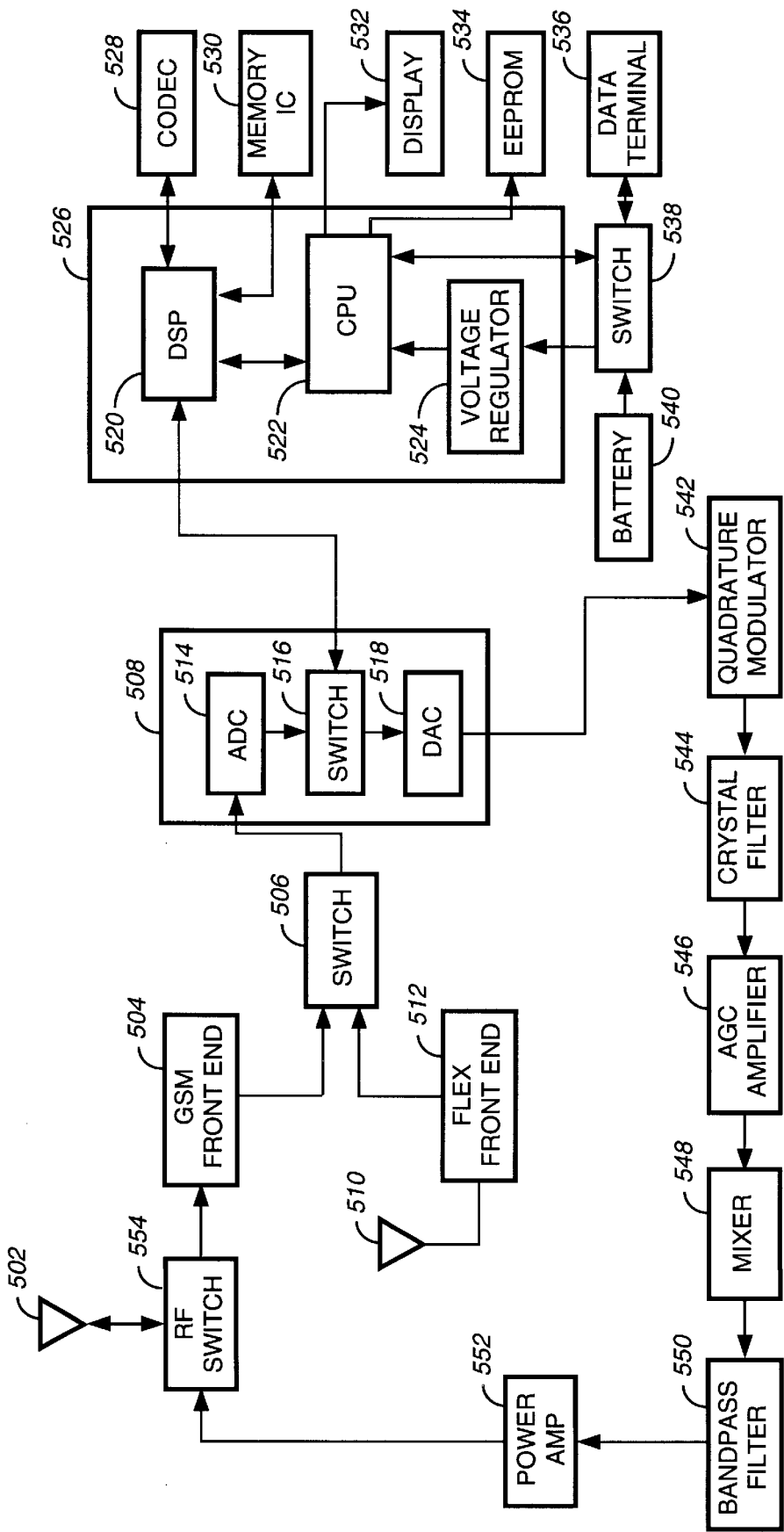
FIG. 5 is an electrical block diagram of the portable communication unit in accordance with the preferred embodiment of the present invention.

Referring to FIG. 5, an electrical block diagram of a portable communication device is shown in accordance with the preferred embodiment of the present invention. The portable communication device 120 comprises cellular telephone and a selective call receiver (pager) integrated as a single device. The portable communication device or selective call device 120 comprises an antenna 502 for receiving and transmitting a cellular signal to and from the GSM base station, e.g., GSM signal. The antenna 502 coupled to a receiver front-end, e.g., GSM receiving circuit, 504 is suitable for intercepting or acquiring a transmitted radio frequency (RF) signal, preferably modulated according for the GSM protocol. The GSM front-end 504 performs functions, e.g., radio frequency amplification, down conversion, radio frequency and intermediate filtering operation, automatic gain control (AGC) and splitting the incoming signal into its baseband In-phase-and-quadrature (I and Q) components. An antenna 510 is coupled to a receiver circuitry, e.g., FLEX front-end, 512 for receiving or acquiring a paging or messaging signals. The FLEX front-end 512 performs the same functions as the GSM front-end but at different bandwidth. Both the GSM front-end and the FLEX front-end are coupled to a voltage control switch 506 which is used to change from GSM to FLEX receiving mode under the control of a processor 526 to be discussed in details below. An integrated circuit 508 is coupled to the switch 506 and comprises an analog-to-digital convertor (ADC) 514 and digital-to-analog convertor (DAC) 518 coupled to a switch 516. The ADC 514 converts the received FLEX and GSM signals from analog to digital form and the switch 516 is used to switch from received to transmit mode during GSM operation. The switch 516 is controlled by the processor 526. Similarly, the DAC 518 converts the base band digital GSM signal into an analog signal before transmission. The processor 526 comprises a digital signal processor (DSP) 520, a central processing unit (CPU) 522 and a voltage regulator 524. The DSP 520 demodulates the received GSM and FLEX messages, generates automatic frequency control (AFC) and automatic gain control (AGC) signals, generates the clock signals needed for the ADC 514, generates the baseband digital I and Q components of the transmitted signal and provides demodulated digital signal which is coupled a Codec 528 and converts digital signal to analog voice and vice versa. The CPU 522 generates signals for driving a display 532, e.g., liquid emitting diode (LED). The voltage regulator 524 provides a constant voltage independent of the load to the other active components in the front-end receiving circuits and the transmitting circuits. A memory IC 530 coupled to the DSP 520 stores filter coefficients, voice samples, etc. and the display 532 provides a graphical interface to the user. An electrical erasable programmable read only memory (EEPROM) 534 stores cap codes. A data terminal 536 enables the coupling a computer, a FAX machine or any other device capable of providing digital information. Coupled to the data terminal 536 is switch 538 for switching power to the selective call device from a battery 540. The switch 538 is controlled by the CPU 522 and when the data terminal is able to provide power, the switch shuts off the internal battery 540 and switch to the power supply from the data terminal 536.

A quadrature modulator 542 performs the up-convert in frequency, using two oscillators in quadrature the baseband I & Q components and combines the complex analog signal supplied from the DAC 518. The quadrature modulator also preamplifies and filters the signal from the DAC 518. A crystal filter 544 coupled to the quadrature modulator 542 filters the signal from the DAC 518 and attenuates the spurs generated. Coupled to the crystal filter 544 is an automatic gain control amplifier 546 that amplifiers the signal according to a control voltage generated by the DSP 520. A mixer 548 coupled to the AGC amplifier 546 which up-converts the intermediate frequency signal to the transmit frequency and a bandpass filter 550 coupled to the mixer 548 filters the signal and attenuates spurs generated by the mixer 548. An amplifier 552 coupled to the filter 550 amplifiers the transmitted signal, preferably a GSM signal, which is applied to the antenna 502 by an RF switch 554 which is controlled by the CPU. The switch 554 switches the antenna from the receiving mode to the transmitting mode during GSM by techniques well know to one of ordinary skill in the art.

Figure 6:
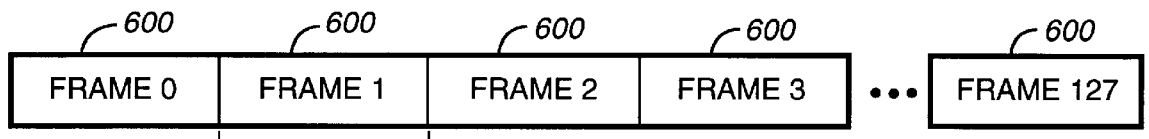
FIGS. 6–9 are timing diagrams of a synchronous signal for transmitting and receiving selective call messages in accordance with the preferred protocol.
Figure 7:
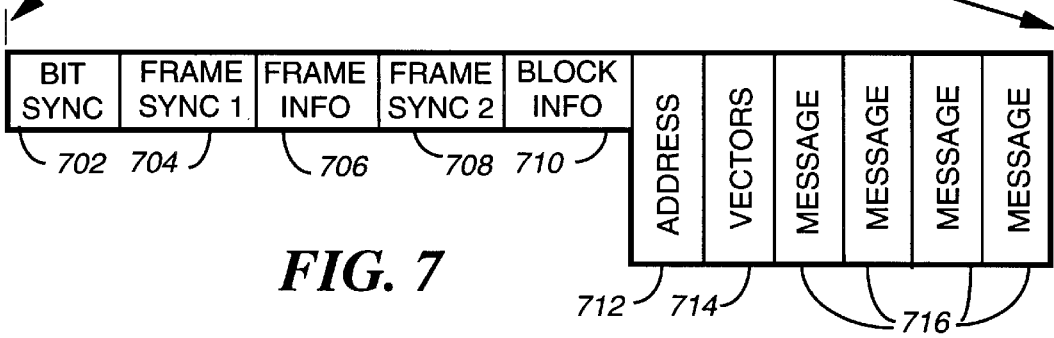

FIG. 6 shows timing diagrams of a synchronous signal in accordance with the preferred protocol. The selective call (paging) signal, e.g., FLEXTM signal protocol comprises of a number of, preferably one-hundred-twenty-eight (128), message packets or frames 600. Each frame 600 is preferably 1.875 seconds in duration and has a preferred base data rate of 6400 bits per second. Although, it will be appreciated that other data rates can be used including the ability to use multiple data rates. Referring to FIG. 7, each frame 600 comprises of a bit sync signal 702, preferably 32 bits of alternating 1,0 pattern, followed by a frame sync #1 signal 704 preferably one of several predetermined thirty-two bit words, and a frame info signal 706, preferably one thirty-two bit word having twenty-one variable information bits containing information such as a cycle number and a frame number. The bit sync signal 702 provides bit synchronization to the selective call receiver(s) 140 while the frame sync signal 704 provides frame synchronization and includes a signal indicative of the data rate of the message information, the details will be discussed below.

Following the frame info word 706 is a frame sync #2 708. Following the frame sync #2 708 is a block info word (BIW) signal 710 including information such as the number of priority addresses, end of block information field, vector start fields and the system collapse value mask, the BIW 710 will be discussed in further detail. The system collapse mask is the same for each 128 frames of a selective call transmission, and is used by the selective call receiver to operate in another battery saving mode or period different from the battery saving mode or period preprogrammed in the selective call receiver 140. The code word of each frames 600 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. The addresses are located in block 712 and the vectors pointing to the messages, if applicable, are located in block 714 and the messages are located in the remaining blocks 716. Preferably, all of the address signals within the frame are located in a first portion 712 and the information signals are located in a subsequent portion of the block 716. It is well known to those skilled in the art how the locate addresses in a first portion 712 and message information 716 in a second portion of the frame 600. Words 712–716 are shown in a vertical orientation to indicate that these words may be interleaved in order to improve the immunity of the transmission to burst errors. It is understood by one of ordinary skill in the art that interleaving may be modified or eliminated.

Figure 8:
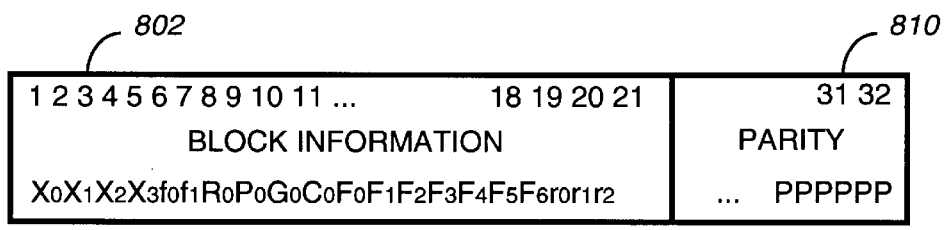

Referring to FIG. 8, a detailed block diagram of the block information word 710 is illustrated. The block information word 710 includes an information block 802 and a parity block 810. The information block 802 includes twenty-one bits and according to the preferred embodiment of the present invention, the $R_0$ bit indicates when the cellular system is too busy to transmit any paging messages or information. The $P_0$ bit or flag indicates when the cellular system is experiencing a peak time or off-peak time loading so the paging system will know the rate for transmitting paging messages on the cellular network. During peak time, the cellular communication system may not want to permit the selective call device to acknowledge receipt of a message. The $G_0$ bit or a control flag indicates which, if any, GSM frequency that is available within the geographic location or area while the $C_0$ bit or flag indicate which, if any, code division multiple access (CDMA) cellular channel or frequency is available. The $F_{0-6}$ bits or flags indicate the preferred cellular channel to use when transmitting paging messages on the cellular system.

Figure 9:
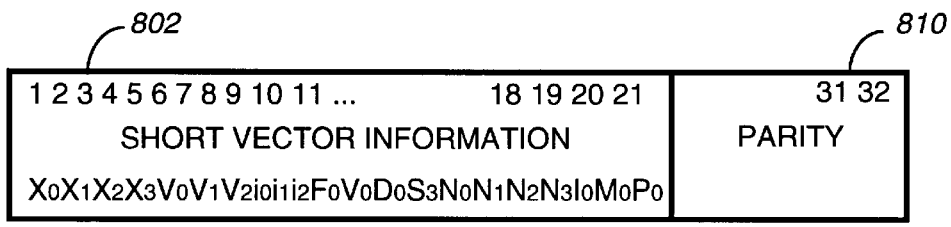

Referring to FIG. 9, the block information word is shown as a short instruction vector. When bits $V_{0-2}$ are set to the value "001," the block information word corresponds to the short instruction vector and when bits or flags $i_{0-1}$ are set to the value "011," information is instruction type. When the $F_0$ flag or bit is set, a FAX (facsimile) message is being sent, the $V_0$ flag or bit indicates a voice message, the $D_0$ flag or bit indicates a data message while the $S_0$ flag or bit indicates a secure message. Flags $N_{0-3}$ indicate the message number, while the $M_0$ flag or bit indicates the message number that has been sent through another medium, e.g., the cellular network. The $P_0$ flag or bit is a priority bit that indicates that the selective call receiver 140 should move to the cellular network immediately because a message is being transmitted by the cellular system. The $I_0$ flag or bit indicates that an inbound message is received by the cellular system.

Figure 10:
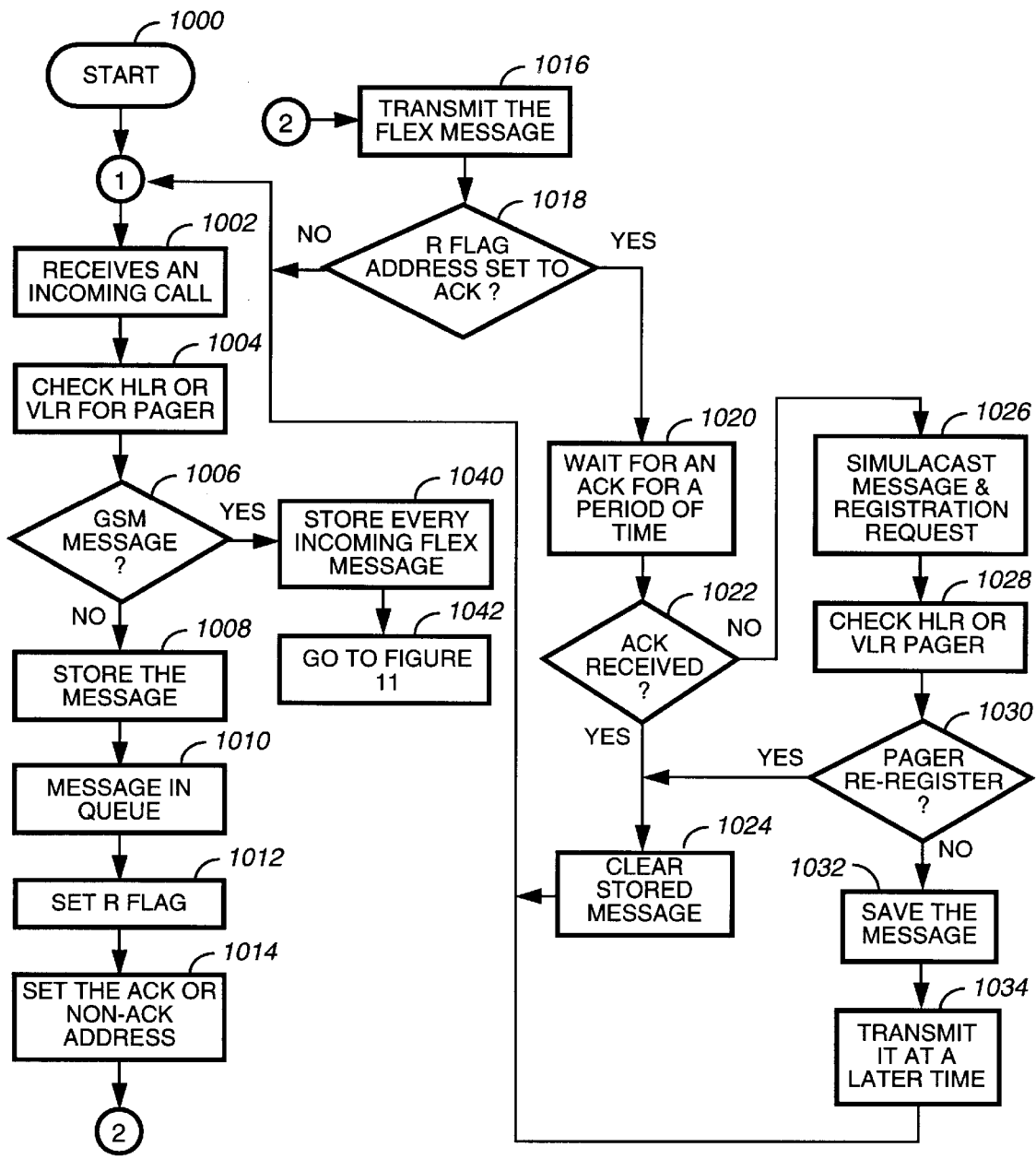
FIGS. 10 and 11 are flow diagrams illustrating the operation of a base station during a base station originated message in accordance with the preferred embodiment of the present invention.
Figure 11:
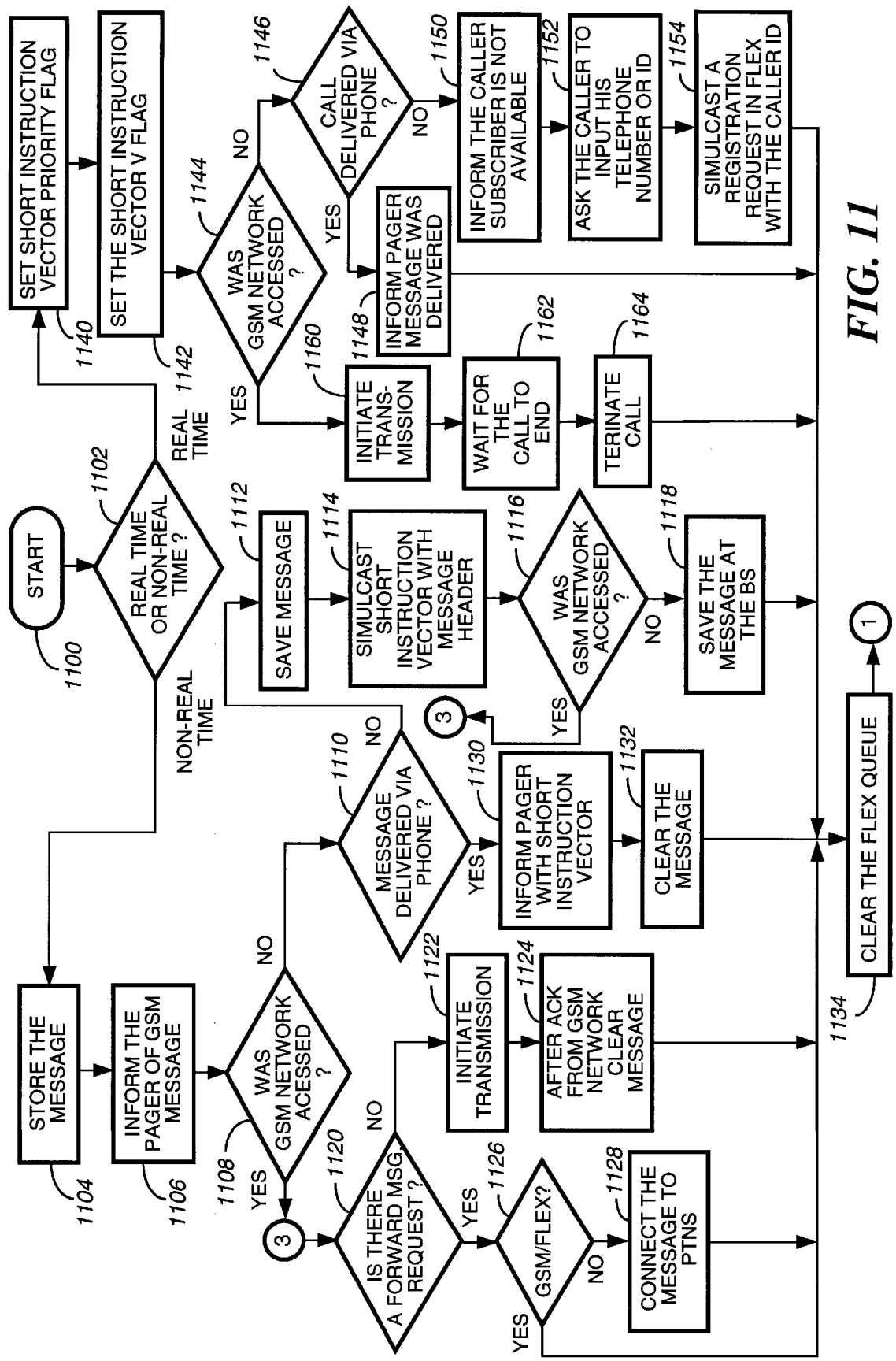

FIGS. 10 and 11 are flow diagrams illustrating the operation of a base station in accordance with the preferred embodiment of the present invention. Referring specifically to FIG. 10, the communication system, e.g., a dual mode base station (that is capable of communicating on both a cellular, e.g., GSM, protocol and a paging, e.g., FLEX, protocol) begins its initialization process, step 1000. The base station receives an incoming call designating a subscriber, step 1002, and first checks or reads the HLR for the latest geographic location of the cellular telephone or pager ("selective call device") that is addressed or designated. If the selective call device identification (ID) is not found in the HLR, the base station then checks the VLR, step 1004. The base station then determine if the message is to be sent or transmitted on the GSM protocol or the FLEX protocol, step 1006. When the base station determines that the message is to be transmitted on the FLEX protocol, step 1006, the message is stored, step 1008, and then placed in a queue to await a transmission cycle, step 1010. Before the message is transmitted, the R flag of the BIW is set to indicate that the message will be transmitted via the FLEX protocol (the cellular system is busy or the message is more appropriate for the FLEX protocol transmission) step 1012. The acknowledge-back (ACK) flag is set or a no-ACK address, step 1014. After the message is transmitted, step 1016, the base station reads or checks if the ACK flag and address are set indicating that it should wait for an ACK response from the selective call device, step 1018. If not, the process returns to wait for other message at step 1002. If the message was set to ACK, step 1018, the base station waits for the ACK from the designated subscriber unit 120, step 1020. Step 1022 determines when the ACK is received or if the time-out period has expired. When the ACK response is received, the message is cleared, step 1024, and then the process returns to step 1002. If the ACK was not received before the time-out period, the predetermined period of time, step 1022, the base station transmits the message in simulcast with a registration request, step 1026. Thereafter, the base station interrogates the HLR and the VLR to determine if the selective call device has to re-register, step 1028. If the selective call device did re-register indicating that the message was successfully received, step 1030, the message is cleared, step 1024 and the process returns to step 1002.

When it is determined that the selective call device had not re-registered, the message is stored, step 1032 and transmitted later, step 1034. Although not shown, the base station may retransmit for a predetermined number of times, and if the message was not received before it returns to step 1002.

Returning to step 1006, when the base station has decided that the message should be transmitted on the cellular network because, e.g., the cellular system is available, the message is more suited for transmission on the cellular network or because the rates are lower, etc., the message is stored, step 1040. The process continues, step 1042, to FIG. 11 at step 1100. The base station determines if the message acquired is a real-time or nonreal time message, step 1102. When the message is determined to be a non-real time message, e.g., a facsimile message, step 1102, the message is stored, step 1104. The base station encodes the short instruction vector (FIG. 9) by setting, e.g., the $F_0$ or the $D_0$ flag of the FLEX protocol to inform the selective call device that a non-real time message will be transmitted via the cellular network, step 1106. The base station then checks if the selective call device was able to access the GSM network, step 1108. If not, the base station checks if the message was delivered through another medium, e.g., the telephone systems (wirelines), step 1110. If yes, the short instruction vector of the FLEX protocol is used to inform the selective call device that the message is already delivered, step 1130. The message is cleared from memory, step 1132, and the FLEX queue is also cleared, step 1134. If the message was not delivered via another medium, step 1110, the message is stored at the base station, step 1112. The base station simulcast the short instruction vector of FLEX with message header, step 1114. In step 1116, the base station checks if the selective call device was able to access the GSM network, and if not, the message is stored at the base station, step 1118.

The process begins at step 1120 either from step 1108 or step 1116, where it is determined if there is a request from the user to forward the message to a different location, step 1120. If not, the base station initiate transmission, step 1122, and after receiving an acknowledgment from the GSM network that the message was transmitted and received properly, the message is then cleared from the base station, step 1124. If a request was received to forward the message, step 1120, the base station determines whether to deliver the message via the wireless medium, e.g., GSM or FLEX or the wireline network, e.g., the telephone lines, step 1126. If the message is to be delivered via the telephone lines, the message transferred to the PSTN, step 1128, and then the FLEX queue is cleared, step 1134.

Alternatively, when a real time message is received or acquired, step 1102, the short instruction vector priority flag is set in the FLEX protocol, step 1140, and then the short instruction vector V flag of the FLEX protocol is also set, step 1142. Thereafter it is checked to determine if the selective call device was able to access the GSM network to receive its message, step 1144. If so, message transmission is initiated, step 1160. When the selective call device accesses the GSM network, the GSM network transmits the message to ensure a timely delivery. If the selective call device does not access the network, the FLEX network is informed within a predetermined length of time. The GSM provides a status of the communication and wait until the communication ends, step 1162, before the communication is terminated, step 1164. On the other hand, when the selective call fails to access the GSM network, the base station determines if the call was delivered through another medium, e.g., the telephone lines, step 1146. If so, the short instruction vector M flag of the FLEX protocol is used to inform the selective call device that the message has been delivered, step 1148. If the message was not delivered via another medium, step 1146, the caller is informed that the intended subscriber is not available, step 1150. The caller is also asked to enter his/her telephone number or identification (ID), step 1152. A registration request is simulcast with the caller ID via the FLEX protocol, step 1154.

Figure 12:
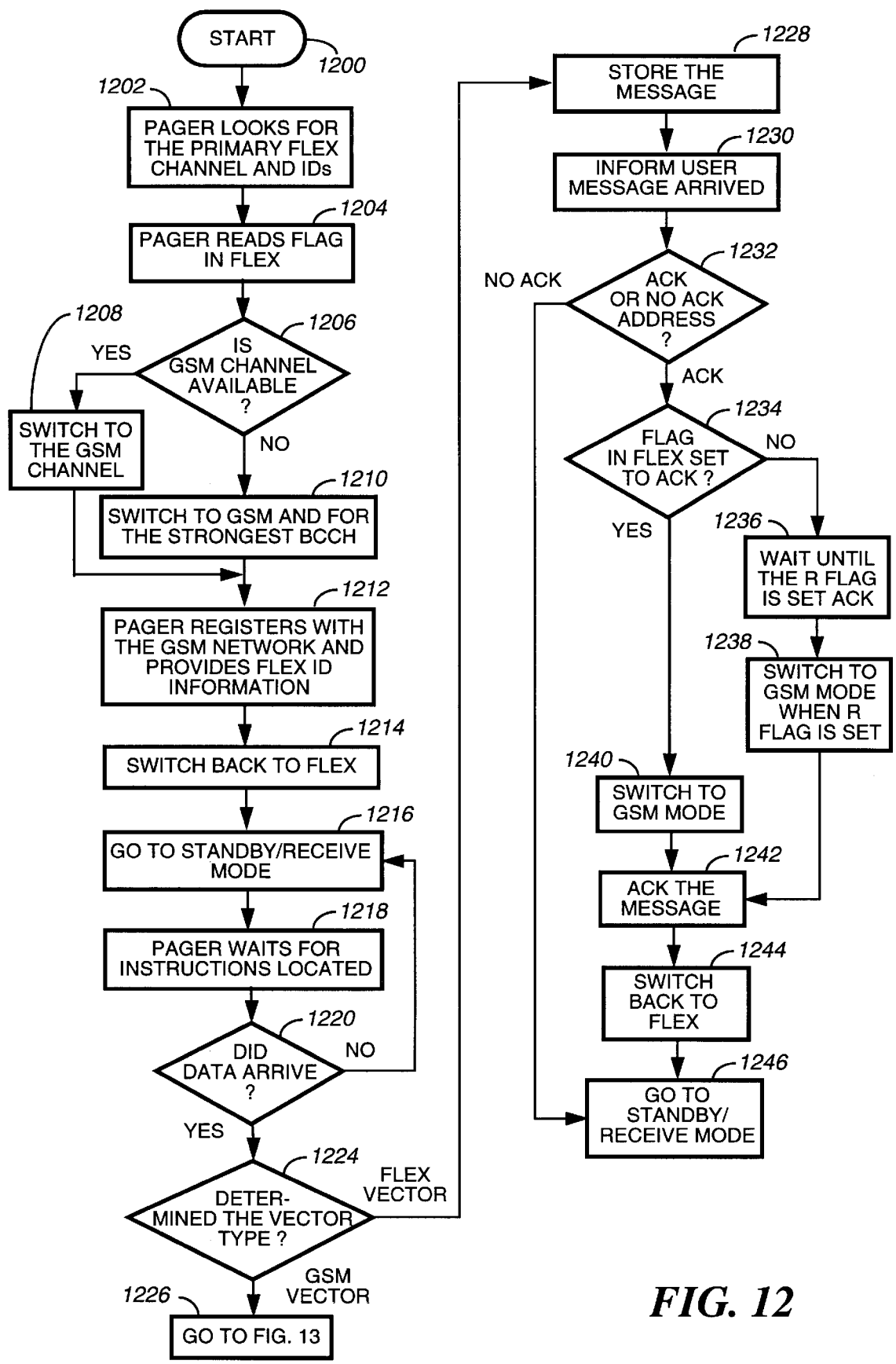
FIGS. 12 and 13 are flow diagrams illustrating the operation of the selective call device when the base station originates a message in accordance with the preferred embodiment of the present invention.

Referring to FIG. 12, a flow diagram is shown illustrating the operation of selective call device operation when the base station originates a message in accordance with the preferred embodiment of the present invention. The process begins at step 1200. The selective call device searches for the control channel, preferably the FLEX channel, Ids and the geographic location data (the station color code), step 1202. After finding the control channel, the selective call device reads or checks the G flag of the block information word (BIW) of the FLEX protocol, step 1204, to determine if the preferred GSM channel is available, step 1206. Generally, information about the preferred GSM channel is stored in memory of the selective call device. If the preferred channel is available, the selective call device switches to that GSM channel, step 1208. Alternatively, when the preferred channel is not available selective call device switches to the GSM protocol and begins to check the signal strength of the different available GSM frequency or channel and selects the GSM channel with the strongest signal strength, step 1210. Thereafter, whether on the preferred GSM channel or the GSM channel with the strongest signal strength, the selective call device registers with the GSM network and provides the FLEX ID information, step 1212. The selective call device then switches back to the FLEX control channel, step 1214, and remain in standby/receive mode, step 1216. When the selective call device locates its address, it waits to receive any corresponding messages or instruction located in the address vector fields indicating where and when the message will be transmitted, step 1218. The selective call device continues waiting until the instruction arrive, step 1220, and if not it returns to its standby mode, step 1216. When the vector arrives, the vector type is determined, step 1224. If it is a FLEX vector, the selective call device remains of the FLEX network to receive and store the message, step 1228. After the receipt of the message, the selective call device will alerts to let the user know that a message was received, step 1230. The selective call device checks or interrogates the address to determine if an ACK or a no-ACK address was received, step 1232. If a no-ACK address was received, the selective call device returns to its standby mode, step 1246.

However, when an ACK address was received, the selective call device checks or interrogates the BIW of the FLEX protocol to determine if the R flag was set to ACK indicating that the selective call device should send a response, step 1234. The cellular communication system can disable acknowledgment when the system is experiencing peak loading. The R flag and the ACK address determines when the selective call device is permitted to send its acknowledgment. If not, the selective call device waits until the R flag is set indicating that it is ready to transmit the ACK, step 1236, the selective call device then switches to the GSM protocol mode, step 1238. If the R flag was set to ACK, step 1234, the selective call device switches to the GSM mode, step 1240. Either from step 1240 or step 1238, the ACK message is transmitted, step 1242, and then the selective call device switches back to the FLEX control channel, step 1244, to go back to the standby mode, step 1246.

Figure 13:
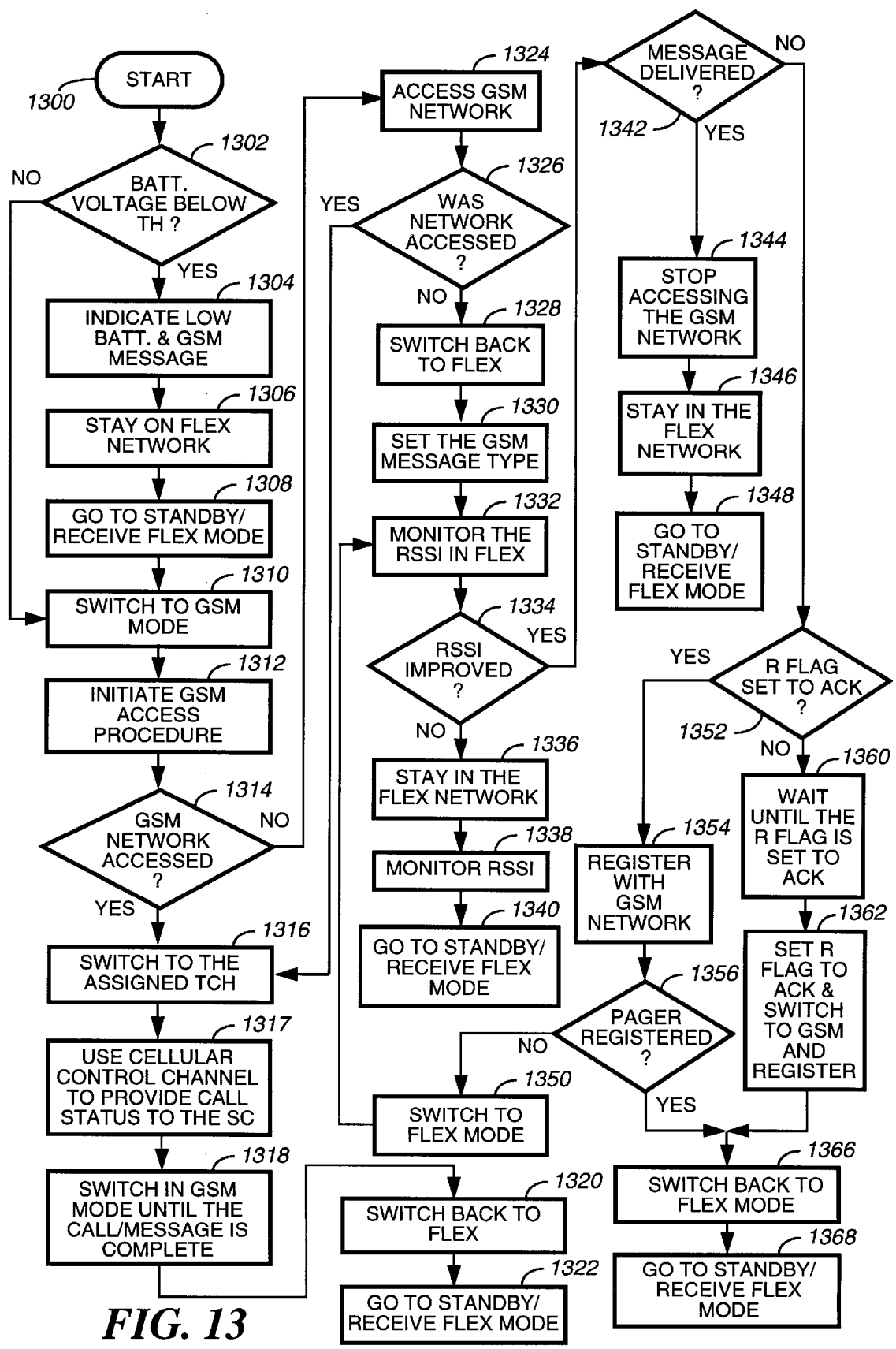

When the vector type indicates GSM vector, step 1224 of FIG. 12, the process continues to FIG. 13, step 1300, and in step 1302, the battery voltage is check to determine whether or not the voltage is below a threshold voltage, step 1302. If voltage is above the threshold, the process transfers to step 1310. When the voltage is below the threshold voltage level, step 1302, the selective call device indicates or set the low battery icon or indicator and let the user know that that there is a GSM message, step 1304. The selective call device stays on the FLEX network, step 1306, returning to the standby mode to receive FLEX messages, step 1308. When the battery voltage is not low, the selective call device switches to the GSM mode, step 1310, and initiates the GSM access procedure, step 1312. If the selective call device accesses the GSM network step 1314, the selective call device switches to the assigned traffic channel (TCH), step 1316. The cellular control channel is used to provide call status to the service center, step 1317 and remains on the GSM channel until the communication is completed, step 1318. After the communication is done, the selective call device switches back to the FLEX control channel, step 1320, and return to the standby mode to receive its FLEX address, step 1322.

Alternatively, when the selective call device fails to access the GSM network, step 1314, it tries to access the GSM network again, step 1324, after which it is determined whether the selective call device was able access the GSM network, step 1326. If the selective call device accesses the GSM network, the process flows to step 1316 as described above. However, if the selective call device fails to access the GSM network again, step 1326, it switches back to the FLEX control channel, step 1328. The selective call device sets the GSM message type indicator to indicate that a GSM message is waiting, step 1330. The received signal strength of the FLEX protocol is monitored, step 1332, and to determine if the received signal strength of the FLEX signal is increasing, step 1334. If there is no improvement of the FLEX received signal strength, the selective call device stays on the FLEX channel, step 1336, to continue to monitor the received signal strength, step 1338, while in the monitoring mode, step 1340.

If the signal strength did improved, step 1334, the selective call device will attempt to determine if the message was delivered by another means, e.g., telephone lines, step 1342. If yes, the selective call device does not access the GSM network, step 1344, and remains on the FLEX network, step 1346, and returns to its standby mode, step 1348. However, if the message was not delivered by another means, step 1342, the selective call device checks if the R flag in the FLEX protocol is set to ACK, step 1352. If yes, the selective call device registers with the GSM network, step 1354. Step 1356 determines if the selective call device was able to register with the GSM network, and if not, the selective call device remains on the FLEX network, step 1350, to monitor the receive signal strength, step 1332. If the R flag was not set, step 1352, the selective call device waits until is set to ACK, step 1360. When the selective call device determines that the R flag is set to ACK, it switches to the GSM mode and begins registration, step 1362. After either step 1356 or step 1362, the selective call device switches back to the FLEX mode, step 1366 and continues in its standby mode, step 1368.

Figure 14:
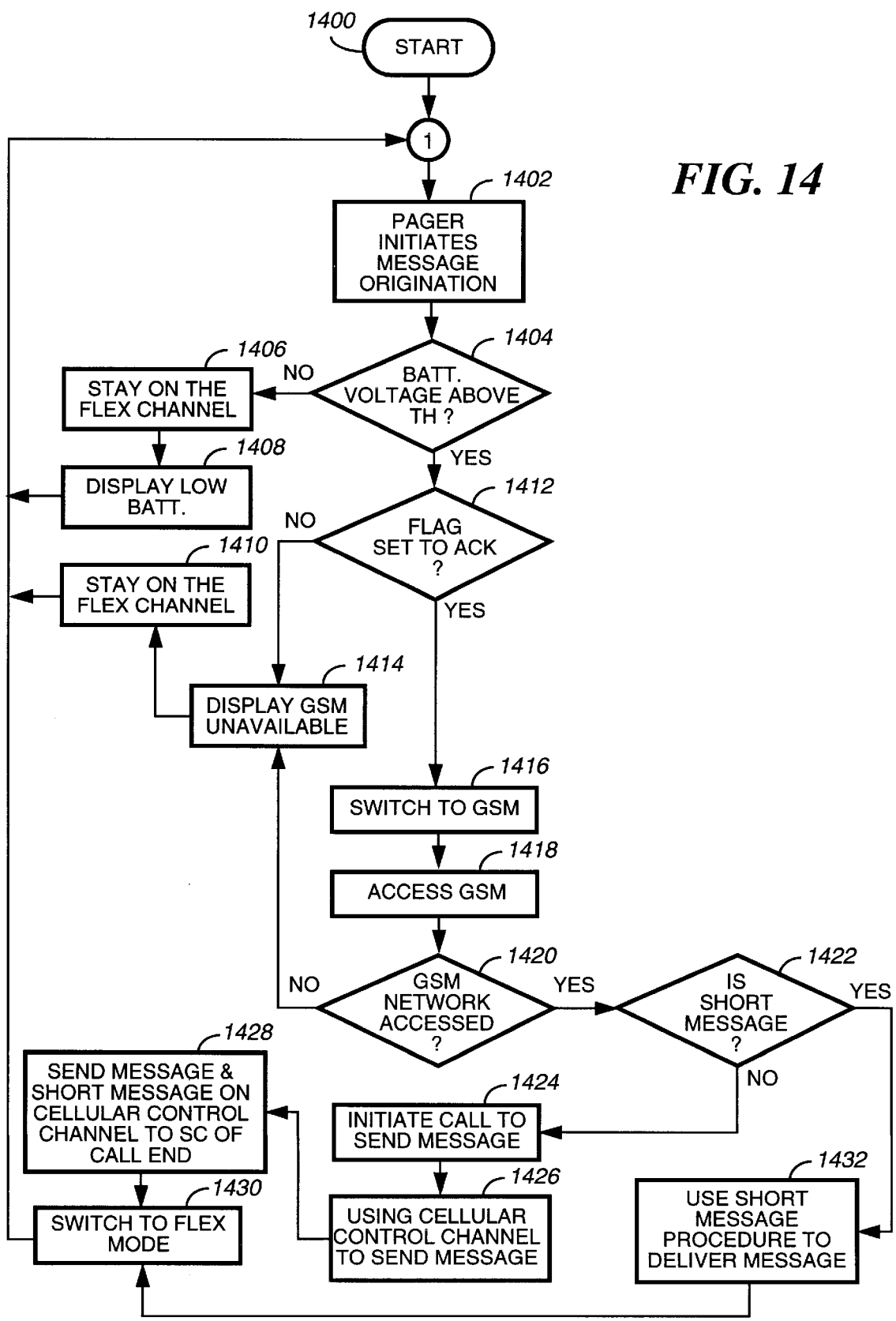
FIG. 14 is a flow diagram of a selective call device originated message protocol in accordance with the preferred embodiment of the present invention.

Referring to FIG. 14, a flow diagram of a selective call device originated message protocol is shown in accordance with the preferred embodiment of the present invention. The initialization process begins at step 1400, and the selective call device initiates a message origination command, step 1402, and thereafter checks if the battery voltage is above the threshold voltage level, step 1404. If no, the selective call device remains on the FLEX control channel, step 1406, and display a low battery icon or indicator, step 1408. On the other hand, if the battery voltage is above the threshold voltage level, step 1404, the selective call device checks if the BIW R flag of the FLEX protocol is set to ACK, step 1412. If not, the selective call device display the unavailable GSM channel icon, step 1414, and remains on the FLEX control channel, step 1410. If the R flag is set to ACK, step 1412, the selective call device switches to the GSM mode, step 1416, initiate the GSM access procedure, step 1418. In step 1420, it is determined whether the selective call device was able to access the GSM channel, and if not, the process returns to step 1414 to display the unavailable GSM channel icon. When the selective call device is able to access the GSM network, step 1402, it determines if it is a short message, step 1422. If it is a short message, the short message procedure is used to deliver the message to the dual mode protocol in the service canter 132. When the message is not the short message type, e.g., voice or text, step 1422, the base station initiate the call or end the text or voice message on the assigned cellular traffic channel (TCH), step 1424. The base station uses the cellular control channel to send a short message to let the service center 132 knows that a call is in progress, step 1426. However, before terminating the call or after sending the entire text message, a short message is sent on the cellular control channel to the service center to inform it that the call has terminated, step 1428. From either step 1432 or step 1428, the selective call device then switches to the paging protocol, e.g., FLEX network, step 1430, and there returns to step 1402.

Figure 15:
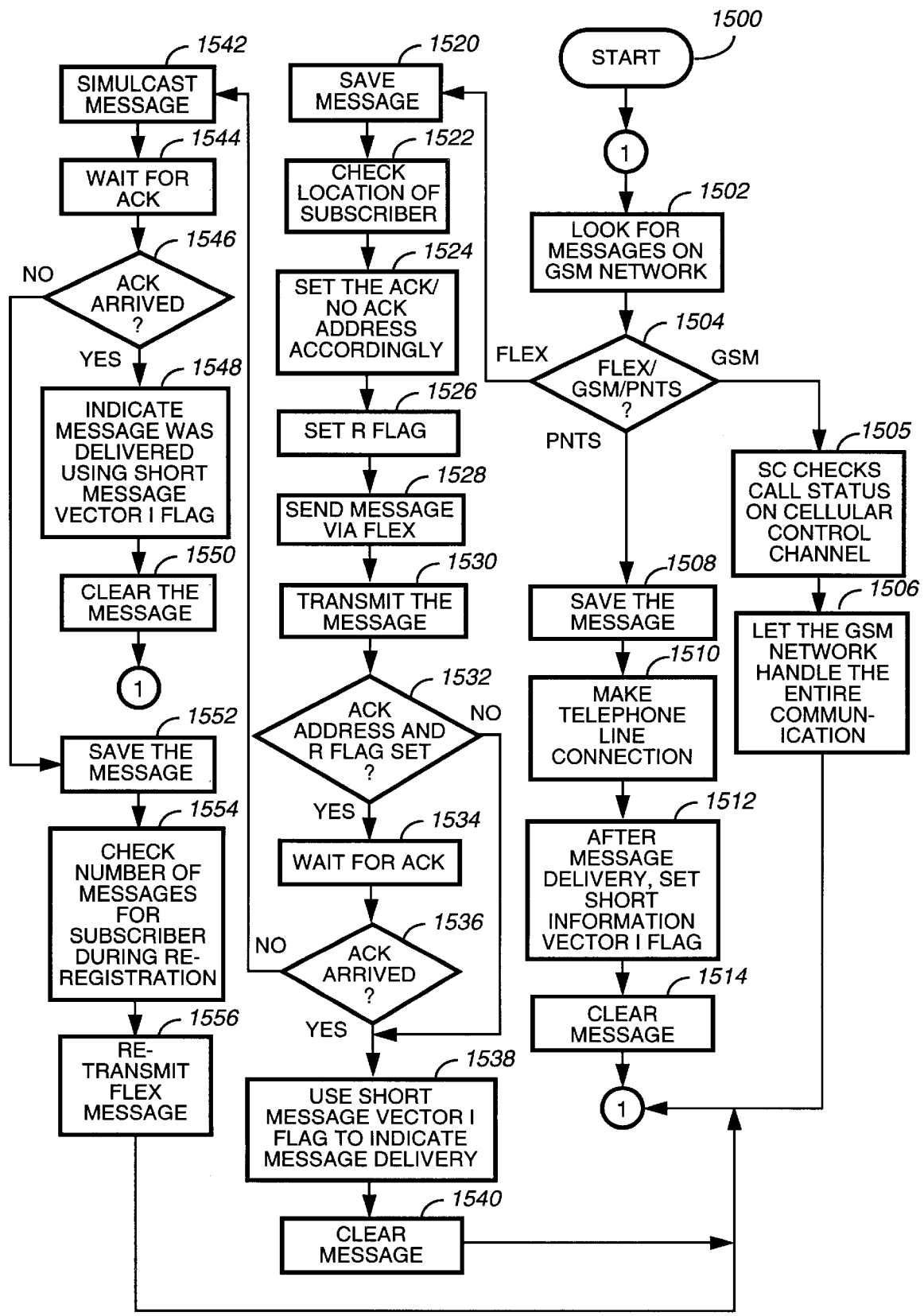
FIG. 15 is a flow diagram illustration of the base station operation when the portable communication unit originates a message in accordance with the preferred embodiment of the present invention.

Referring to FIG. 15, a flow diagram illustrating the base station operation when the portable communication unit originates a message is shown in accordance with the preferred embodiment of the present invention. The initialization process begins, step 1500, and base station checks for incoming messages on the GSM network, step 1502. Block 1504 checks if the message is arriving on the FLEX, the GSM or the PSTN network. If message is arriving via the GSM network, the service center checks the call status information on the cellular control channel, step 1505 and allows the base station allows the GSM network to handle the entire communication including the call or message transfer procedure, step 1506. When the message is arriving via the PSTN, step 1504, the message is saved at the base station, step 1508, and then a telephone line interconnection is made, step 1510. When the message is delivered, the short information vector I flag of the FLEX protocol is set, step 1512, and the message is cleared, step 1514.

Finally, when the message is arriving via the FLEX network, the geographic location (or color code) is preferably included in the paging signal, step 1504, the message is saved at the base station, step 1520. The base station checks the latest location in the GSM HLR for the designated subscriber, step 1522, and set the ACK or No-ACK address of the intended or designated subscriber, step 1524. The base station checks the BIW R flag, step 1526, and transfer the message to the appropriate FLEX base station, step 1528, where the message is transmitted, step 1530. After the transmission of the message, it is determined whether the ACK address and the R flag were set, step 1532, and if not the process skips to step 1540. Otherwise, if the ACK address and the R flag are set, step 1532, the base station waits for the ACK for a predetermined period of time, step 1534. If the ACK was received, step 1536, the base station informs the user that the message was delivered by setting the short message vector I flag in the FLEX protocol, step 1538, and then the message is cleared from memory, step 1540.

If the ACK did not arrive within the predetermined period of time, step 1536, the base station simulcast the message on the FLEX control channel, step 1542, and waits for a predetermined period of time or until the ACK is received during re-registration, step 1544. In step 1546, it is determined whether the ACK was received, and if so, the user is informed that the message was delivered by setting the short message vector I flag of the FLEX protocol, step 1548, and then the message is cleared from memory, step 1550. If the ACK did not arrive within the predetermined period, step 1546, the message is saved, step 1552, and when intended subscriber re-register, the base station determines how many messages are in memory for the subscriber, step 1554. The base station retransmits all the pending messages to the re-registered subscriber(s), step 1556 on a cellular control channel while the selective call device is actively communication on the cellular channel.

Figure 16:
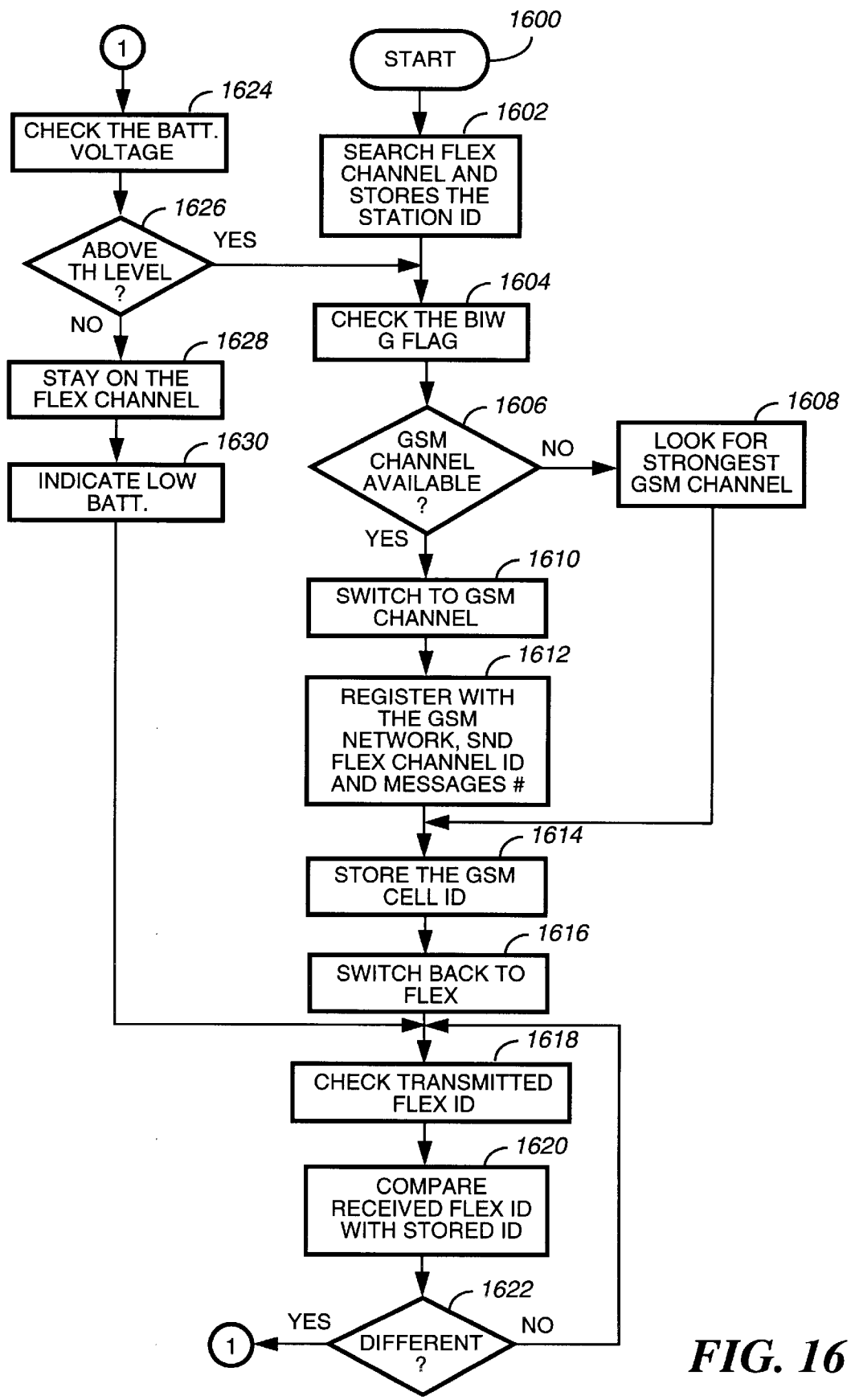
FIG. 16 is a flow diagram illustration of the selective call device originated registration procedure in accordance with the preferred embodiment of the present invention.

Referring to FIG. 16, a flow diagram illustration of the selective call device originated registration procedure is shown in accordance with the preferred embodiment of the present invention. The initialization procedure begins at step 1660, followed by the selective call device searching for and acquiring the FLEX control channel including the geographic location code (color code) and storing the station ID (color code), step 1602. The selective call device checks the BIW G flag of the FLEX protocol, step 1604 to determine if there is preferred GSM channel in the area, step 1606. If not, the selective call device switches to the GSM mode to look at the received signal strength to determine the GSM channel with the highest signal strength, step 1608. If a preferred GSM channel is found, step 1606, the selective call device switches to the GSM channel, step 1610, and registers with the GSM network, send the received FLEX channel ID to the base station and the received message number, step 1612. The GSM cell ID is stored, step 1614 and then the selective call device switches back to the FLEX protocol, step 1616. The selective call device checks the transmitted FLEX ID, step 1618, and compare the received FLEX ID with the ID stored in memory, step 1620. After the comparison, step 1622 determines if they are different, if not, the process returns to step 1618. When the FLEX ID is different from the transmitted ID, step 1622, the selective call device checks its battery voltage, step 1624, to determine if it is above a threshold level, step 1626. If the voltage is above the threshold, step 1626, the process returns to step 1604 to check the G flag of the BIW in the FLEX protocol. When the voltage is below the threshold, step 1626, the selective call device remains on the FLEX control channel, step 1628, and indicates or sets the low battery icon or indicator, step 1630, then the process continues to step 1618.

We claim:

1. In a combined paging communication system and cellular communication system, a method for transmitting a paging message on the cellular communication system, comprising the steps of:

acquiring a paging signal as a control channel for a selective call device, the paging signal indicating a geographic location;

receiving a control flag indicating a cellular channel to the selective call device;

registering with the cellular communication system on the cellular channel indicated by the control flag of the paging signal;

sending status information from the cellular communication system to the paging communication system for authenticating the selective call device;

receiving the paging message on the control channel of the paging communication system;

transmitting an address and a vector on the control channel to the selective call device directing the selective call device to the cellular channel of the cellular communication system for receiving the paging message;

reading a flag in the paging signal to determine if the paging communication system is requesting the selective call device to acknowledge its receipt of the address and vector;

transferring the paging message to the cellular communication system for transmission on the cellular channel to the selective call device in response to the paging communication system receiving an acknowledgment from the selective call device indicating that the vector was received; and transmitting the paging message by a cellular base station located within the geographic location indicated by registration information stored in the cellular communication system.

2. The method according to claim 1 wherein the step of registering further comprising a step of measuring a signal strength of the paging signal by the selective call device when the selective call device is unable to register with the cellular communication system for determining when to attempt a re-registration with the cellular communication system.

3. The method according to claim 1 wherein the step of registering further comprising to a step of re-registering with the cellular communication system when the selective call device receiving a geographic location of the paging signal is different from the geographic location previously received by the selective call device.

4. The method according to claim 1 further comprising the steps of:

receiving an ACK address by the selective call device wherein the ACK address informs that the selective call device to acknowledge a receipt of the paging message; and receiving a No-ACK address by the selective call device wherein the No-ACK address informs the selective call device to not acknowledge a receipt of the paging message.

5. The method according to claim 4 further comprising the step of interrogating a control flag of the paging signal to determine if the cellular communication system is allowing the selective call device to acknowledge the receipt of the paging signal in response to the selective call device receiving the ACK address.

6. The method according to claim 5 further comprising a step of checking the control flag by the selective call device to determine when to acknowledge the receipt of the paging message.

7. The method according to claim 1 wherein the step of transferring further comprising the step of delivering priority messages and undelivered messages on a cellular control channel to the selective call device which is communicating on the cellular channel.

8. A combined paging communication system and cellular communication system for communicating with a selective call device, the selective call device comprising:

a receiver for acquiring a paging signal as a control channel for a selective call device, the paging signal indicating a geographic location;

a controller, coupled the receiver, for decoding a control flag to determine whether a cellular channel is available;

a transmitter, coupled to controller, for registering with the cellular communication system on the cellular channel indicated by the control flag of paging signal;

a service center for transferring status information from the cellular communication system to the paging communication system for authenticating the selective call device;

the receiver for receiving a paging message on the control channel of the paging communication system;

a transmitter, coupled to the service center, for transmitting an address and a vector on the control channel to the selective call device directing the selective call device to the cellular channel of the cellular communication system for receiving the paging message;

the selective call device reads a flag in the paging signal to determine if the paging communication system is requesting the selective call device to acknowledge its receipt of the address and vector;

the service center transfers the paging message to a cellular base station for transmission on the cellular channel to the selective call device in response to the paging communication system receiving an acknowledgment from the selective call device indicating that the vector was received; and the cellular base station transmits the paging message at a location indicated by registration information stored in the cellular communication system.

9. The combined paging communication system and cellular communication system according to claim 8 wherein the receiver of the selective call device measures a signal strength of the paging signal when the selective call device is unable to register with the cellular communication system for determining when to attempt a re-registration with the cellular communication system.

10. The combined paging communication system and cellular communication system according to claim 8 wherein the receiver of the selective call device re-registers with the cellular communication system when the selective call device receives a geographic location of the paging signal different from the geographic location previously received by the selective call device.

11. The combined paging communication system and cellular communication system according to claim 8 wherein the receiver receives an ACK address informing the selective call device to acknowledge a receipt of the paging message and a no-ACK address informing the selective call device to not acknowledge a receipt of the paging message.

12. The combined paging communication system and cellular communication system according to claim 11 wherein the controller interrogates a control flag of the paging signal to determine if the cellular communication system loading permits the selective call device to acknowledge the receipt of the paging signal in response to the selective call device receiving the ACK address.

13. The combined paging communication system and cellular communication system according to claim 12 wherein the controller continually checks the control flag to determine when to acknowledge the receipt of the paging message upon the receipt of the ACK address.

14. The combined paging communication system and cellular communication system according to claim 8 wherein the service center transfers priority messages and undelivered messages on a cellular control channel to the selective call device which is communicating on the cellular channel.

\* \* \* \* \*